US012613311B2

(12) United States Patent
Jeannin et al.

(10) Patent No.: US 12,613,311 B2
(45) Date of Patent: Apr. 28, 2026

(54) CALIBRATION OF RADAR WITH MULTIPLE TRANSMITTERS

(71) Applicant: Infineon Technologies AG, Neubiberg (DE)

(72) Inventors: Mayeul Jeannin, Munich (DE); Farhan Bin Khalid, Munich (DE); Dian Tresna Nugraha, Bandung (ID)

(73) Assignee: Infineon Technologies AG, Neubiberg (DE)

( * ) Notice: Subject to any disclaimer, the term of this patent is extended or adjusted under 35 U.S.C. 154(b) by 379 days.

(21) Appl. No.: 18/193,716

(22) Filed: Mar. 31, 2023

(65) Prior Publication Data

US 2023/0333208 A1 Oct. 19, 2023

(30) Foreign Application Priority Data

Apr. 12, 2022 (DE) ..................... 10 2022 108 836.7

(51) Int. Cl.
| | |
|---|---|
| *G01S 7/40* | (2006.01) |
| *G01S 7/35* | (2006.01) |
| *G01S 13/58* | (2006.01) |

(52) U.S. Cl.
CPC ............ *G01S 7/4008* (2013.01); *G01S 7/356* (2021.05); *G01S 7/40* (2013.01); *G01S 13/584* (2013.01)

(58) Field of Classification Search
CPC ..... G01S 2013/0245; G01S 2013/0254; G01S 13/931; G01S 13/584; G01S 13/325; G01S 7/356; G01S 7/354; G01S 7/0234; G01S 7/0233; G01S 7/40; G01S 7/4008; H04B 17/21; H04B 17/12; H01Q 3/267
(Continued)

(56) References Cited

U.S. PATENT DOCUMENTS

| | | | | |
|---|---|---|---|---|
| 3,679,983 A | * | 7/1972 | Theriot | ................. G01S 13/282 342/201 |
| 4,447,910 A | * | 5/1984 | Smith | ............... H04L 25/03038 375/232 |

(Continued)

OTHER PUBLICATIONS

Mayeul Jeannin et al., "Modeling and Removing Doppler Division Multiplexing Spurs in Automotive MIMO Radar", IEEE Sensors Journal, vol. 23, No. 2, Published Jan. 15, 2023.
(Continued)

*Primary Examiner* — Michael W Justice
(74) *Attorney, Agent, or Firm* — Eschweiler & Potashnik, LLC

(57) ABSTRACT

A radar system has a plurality of radar transmitters and at least one radar receiver, each radar transmitter having a transmitter adjuster for tuning the output of the respective transmitter, for example tuning the phase of each of a plurality of constellation points of a constellation. The radar system may operate in a calibration cycle by transmitting from a single radar transmitter using the transmitter adjuster, obtaining an estimate of the error in the transmitter adjuster and adjusting the transmitter adjuster according to the estimate of the error. In an operation cycle the radar system may transmit using the plurality of radar transmitters, the signal being transmitter from each radar transmitter being tuned using the transmitter adjuster. Calibration cycles are interspersed between operation cycles during operation.

19 Claims, 8 Drawing Sheets

(58) Field of Classification Search

USPC .................................. 342/174, 70, 165, 196

See application file for complete search history.

(56) References Cited

U.S. PATENT DOCUMENTS

| | | | | |
|---|---|---|---|---|
| 4,626,856 | A * | 12/1986 | Pierson ................... | G01S 7/288 |
| | | | | 342/174 |
| 5,412,414 | A * | 5/1995 | Ast ....................... | G01S 7/4017 |
| | | | | 342/372 |
| 5,977,906 | A * | 11/1999 | Ameen ................. | G01S 13/931 |
| | | | | 342/174 |
| 6,819,285 | B1 * | 11/2004 | Stockman ............. | G01S 7/4021 |
| | | | | 342/146 |
| 7,248,216 | B2 * | 7/2007 | Akiyama ............... | H01Q 3/267 |
| | | | | 342/368 |
| 7,440,732 | B2 * | 10/2008 | Pan ...................... | H04B 1/0475 |
| | | | | 455/114.2 |
| 7,474,259 | B2 * | 1/2009 | Manor .................... | G08G 1/04 |
| | | | | 701/119 |
| 8,718,576 | B2 * | 5/2014 | Sun ...................... | H04B 1/0475 |
| | | | | 455/114.1 |
| 8,731,005 | B2 * | 5/2014 | Schlee ................. | H04B 17/102 |
| | | | | 455/575.8 |
| 9,031,163 | B2 * | 5/2015 | Matsuo ................. | H04L 1/0033 |
| | | | | 375/299 |
| 9,939,316 | B2 * | 4/2018 | Scott ......................... | G01J 1/44 |
| 10,473,518 | B2 * | 11/2019 | Scott ..................... | G01S 7/497 |
| 10,534,143 | B1 * | 1/2020 | Droz ................... | G02B 6/4226 |
| 10,903,567 | B2 * | 1/2021 | Vehovc ................. | H01Q 3/267 |
| 10,955,528 | B2 * | 3/2021 | Zanati ................... | H01Q 3/267 |
| 11,018,728 | B2 * | 5/2021 | Lang ..................... | H04B 1/48 |
| 11,029,388 | B2 * | 6/2021 | Melzer ................. | G01S 7/4017 |
| 11,099,052 | B2 * | 8/2021 | Wildey ................... | G01S 13/00 |
| 11,262,448 | B2 * | 3/2022 | Davis ..................... | G01S 13/87 |
| 11,428,775 | B2 * | 8/2022 | Melzer .................... | G01S 7/023 |
| 11,448,745 | B2 * | 9/2022 | Takeuchi ............... | G01S 13/42 |
| 11,533,067 | B1 * | 12/2022 | Guan ................... | H04B 1/1607 |
| 11,585,892 | B1 * | 2/2023 | Spaulding ............. | G01S 7/4021 |
| 11,815,585 | B2 * | 11/2023 | Wu ....................... | G01S 13/282 |
| 11,940,314 | B2 * | 3/2024 | Wildey ................. | G01F 23/284 |
| 12,061,249 | B1 * | 8/2024 | Loui ........................ | G01S 13/90 |

| | | | | |
|---|---|---|---|---|
| 2006/0279459 | A1 * | 12/2006 | Akiyama ............... | H01Q 3/267 |
| | | | | 455/67.11 |
| 2007/0049220 | A1 * | 3/2007 | Pan ....................... | H04B 1/0475 |
| | | | | 455/127.1 |
| 2007/0236365 | A1 * | 10/2007 | Manor .................... | G01S 13/91 |
| | | | | 340/933 |
| 2010/0127932 | A1 * | 5/2010 | Heikkinen ............. | H04B 17/21 |
| | | | | 342/374 |
| 2011/0085490 | A1 * | 4/2011 | Schlee ................... | H04B 17/12 |
| | | | | 370/315 |
| 2011/0193606 | A1 * | 8/2011 | Sun ....................... | H04B 1/0475 |
| | | | | 327/237 |
| 2012/0020396 | A1 * | 1/2012 | Hohne ................... | H01Q 3/267 |
| | | | | 375/224 |
| 2014/0192923 | A1 * | 7/2014 | Matsuo .................... | H01Q 3/28 |
| | | | | 375/296 |
| 2017/0089756 | A1 * | 3/2017 | Scott ...................... | G01S 17/894 |
| 2017/0367065 | A1 * | 12/2017 | Seth ................... | H04L 43/0864 |
| 2018/0164152 | A1 * | 6/2018 | Scott ..................... | H10F 30/225 |
| 2019/0146059 | A1 * | 5/2019 | Zanati ................... | G01S 13/931 |
| | | | | 342/173 |
| 2019/0235051 | A1 * | 8/2019 | Melzer .................... | G01S 7/032 |
| 2019/0271776 | A1 * | 9/2019 | Davis ...................... | G01S 13/87 |
| 2019/0372218 | A1 * | 12/2019 | Vehovc .................. | H04B 17/12 |
| 2019/0391249 | A1 * | 12/2019 | Takeuchi .............. | G01S 13/536 |
| 2020/0053691 | A1 * | 2/2020 | Seth .................... | H04L 43/0858 |
| 2020/0110233 | A1 * | 4/2020 | Droz .................... | G02B 6/4221 |
| 2020/0217706 | A1 * | 7/2020 | Wildey ................... | G01S 13/00 |
| 2020/0382170 | A1 * | 12/2020 | Lang ........................ | H03M 1/12 |
| 2021/0080537 | A1 * | 3/2021 | Melzer .................. | G01S 13/584 |
| 2022/0065683 | A1 * | 3/2022 | Wildey ................... | G01S 7/032 |
| 2022/0283286 | A1 * | 9/2022 | Wu ........................ | G01S 13/931 |
| 2022/0308160 | A1 * | 9/2022 | Dent ....................... | G01S 7/025 |
| 2023/0305132 | A1 * | 9/2023 | Subburaj .............. | G01S 13/343 |
| 2024/0145912 | A1 * | 5/2024 | Brillant ................. | H04B 17/12 |
| 2024/0353550 | A1 * | 10/2024 | Loui ...................... | G01S 7/038 |

OTHER PUBLICATIONS

Mayeul Jeannin et al., "An Iterative Phase Shifters Online Calibration Technique for Automotive Radar Systems", Published Sep. 28-30, 2022.

* cited by examiner 50    52

CALIBRATION OF RADAR WITH MULTIPLE TRANSMITTERS

REFERENCE TO RELATED APPLICATIONS

This application claims priority to German Patent Application 10 2022 108 836.7, filed on Apr. 12, 2022. The contents of the above-referenced Patent Application is hereby incorporated by reference in its entirety.

FIELD

The disclosure relates to a radar method with multiple transmitters, for example for an automotive application, as well as apparatus for carrying out a radar method, for example including calibration.

BACKGROUND

There is an increasing demand for sensors of various kinds to detect the environment around a vehicle and to hence provide inputs for various driving control and monitoring applications. Radar plays an important role in detecting the presence of objects. Increasingly, radars for automotive and other vehicle applications are being fitted in cars. Often, a plurality of transmitters (Tx) and receivers (Rx) are provided to allow for improved radar detection, in particular for example to enable the direction of objects to be more accurately detected, for example using multiple input multiple output (MIMO) radar receivers.

Slow-time phase-coded (ST-PC) waveform is a popular frequency modulated continuous wave (FMCW) ramp modulation technique for automotive multiple input multiple output (MIMO) radars. Accurate modulation of the transmitted signal is required to obtain reliable and precise measurement of the positions of objects.

For example, automated driving applications require higher angular resolution of a radar sensors as compared to advanced driver assistance systems. Higher angular resolution in frequency modulated continuous wave (FMCW) multiple input multiple output (MIMO) radar systems comes at the cost of an increased number of physical channels, both on the transmit (Tx) side and receive (Rx) side. Such radar systems utilize multiplexing techniques to take advantage of the MIMO properties. Some known Tx multiplexing techniques for automotive FMCW MIMO radar systems are time-division multiplexing (TDM) and slow-time phase-coded FMCW (ST-PC).

Calibration of the phase shifter may be carried out at end of line, e.g. at the end of the production process in the factory. However, such approaches do not cope with the drift in parameters that may take place over time, or changes in operating conditions such as temperature.

There is accordingly a need for improved calibration techniques that may be used to calibrate multiple radar transmitters for example for ST-PC FMCW systems.

SUMMARY

According to a first aspect of the disclosure, there is provided a method of operating a radar system having a plurality of radar transmitters and at least one radar receiver, each radar transmitter having a transmitter adjuster for tuning the output of the respective transmitter, the method comprising:
  a. in a calibration cycle, transmitting from a single radar transmitter using the transmitter adjuster;

b. obtaining an estimate of the error in the transmitter adjuster,
  c. adjusting the transmitter adjuster according to the estimate of the error; and
  d. in an operation cycle, transmitting using a plurality of radar transmitters, the signal being transmitted from each radar transmitter using the tuned transmitter adjuster; and
  e. repeating calibration cycles interspersed between operation cycles during operation.

By operating a radar system with calibration in this way, it is possible to provide a relatively accurate transmit (Tx) phase modulation to avoid modulation artifacts that would otherwise degrade radar system performance.

Increasing sensing requirements for automated driving application using radar sensor technology are limited by the drifting nature of phase errors. Tx phase shifter error drift can be challenging to model rendering the classical end-of-line calibration sub-optimal.

Particular embodiments of the disclosure relate to the use of ST PC systems. Note however that the same techniques may also be of benefit for any system where phase calibration of Tx phase shifters is required or advantageous.

For lower levels of autonomous driving (AD), TDM is preferred for its simplicity of implementation and low signal processing requirements. With higher AD levels and the associated increased number of Tx channels, TDM is not suited anymore as the number of Tx channels imposes a direct constraint on the maximum unambiguous velocity. Furthermore, TDM systems suffer from velocity-angle coupling. In contrast to TDM, ST-PC FMCW radar systems offer the possibility of simultaneous Tx emission using ramp-to-ramp phase coding.

ST-PC FMCW systems utilize Tx phase shifters (PS) to control individual ramp phases. Any PS imperfection would lead to an incorrect modulation and deterioration of the ideal system performance. In order to calibrate these phase shifters, calibration may be done in the manufacturing process during end-of-line calibration (EoLC). Unfortunately, EoLC does not address drift of errors and, in particular, drift of Tx PS errors along parameters such as temperature and age of the system.

The method described here can address this specific difficulty by providing for correction of Tx PS errors on an ongoing basis during operation.

The step of adjusting the transmitter adjuster may use an iterative approach to adjust the transmitter adjuster over several iterations of the calibration cycle. In a particular example, the step of adjusting the transmitter adjuster using an estimate of the error adjusts the transmitter adjuster using a fraction p of the estimated error where p is no greater than 0.2 so that the respective transmitter is tuned successively over plural calibration cycles. The fraction may for example be constant or adapted dynamically. For example, where a strong peak corresponding to a target is detected and used the error estimate may be more accurate and so a higher value of p may be used.

In order to calibrate each radar transmitter, in successive calibration cycles different single radar transmitters may be used.

Preferred embodiments of the disclosure use plural radar receivers in a multiple input multiple output (MIMO) approach.

In embodiments of the method, the calibration cycle, after transmitting from the single radar transmitter, may include
  a. receiving a resulting signal on the plurality of radar receivers;

b. carrying out a range FFT over the fast time dimension to obtain a range-slow time representation c. carrying out a Doppler FFT over the slow time dimension to obtain a range-Doppler representation;

d. carrying out a Peak detection on the range-Doppler representation to create a target list;

e. selecting a target from the target list;

f. carrying out a range vector extraction on the decoded range Fourier transform corresponding to the range selected target to obtain an extracted range vector; and g. carrying out the step of obtaining an estimate of the error using the extracted range vector.

The method may further include the step of carrying out motion compensation on the extracted range vector and using the motion compensated extracted range vector.

The step of selecting a target may select a target from the target list that is selected on the criteria of being separated in range and Doppler from other targets in the target list and/or by representing a strong signal peak.

The steps of receiving a resulting signal on the at least one radar receiver, carrying out a range FFT over the fast time dimension to obtain a range-slow time representation and carrying out a Doppler FFT over the slow time dimension to obtain a range-Doppler representation may be carried out in both the calibration cycle and the operation cycle. The method may further process the received range-Doppler representation to identify positions of targets in both the operation cycle and the calibration cycle. Note that this can take place even though the range-Doppler representation in the calibration cycle is impaired by the use of only one transmitter, not at least two.

Each transmitter may transmit at a plurality of constellation points of a constellation, and each transmitter adjuster is a transmitter phase shifter arranged to control the phase of individual ramp phases of respective constellation points on the respective individual transmitter. For example, when using quadrature phase shift keying, QPSK, the constellation includes four constellation points at the phases nominally at $0$, $\pi/2$, $\pi$ and $3\pi/2$. The phase error at each of these constellation points may be measured and then applied to separately correct each of the constellation points individually.

In a second aspect of the disclosure there is provided a method of radar calibration comprising:

a. receiving radar data as a function of slow time and fast time;

b. carrying out a range FFT over the fast time dimension to obtain a range-slow time representation c. carrying out a Doppler FFT over the slow time dimension to obtain a range-Doppler representation;

d. identifying a target together with a corresponding range, received amplitude, measured direction of arrival and measured Doppler signal, e. extracting the vector corresponding to the range-slow time representation at the range of said target as a function of slow time (m); and f. calculating the phase corresponding to the said bins in the range line taking into account the said received amplitude, measured direction of arrival and measured Doppler signal.

In the case that the target is the dominant or only target at the said range, wherein the each of the bins of the range line correspond to one of a plurality of points of a constellation, the step of calculating may be carried out for each constellation point by averaging the phase deviation for each of the bins corresponding to that constellation after correcting the measured phase of each constellation point for the measured direction of arrival and Doppler signal.

In a third aspect of the disclosure there is provided a radar apparatus comprising:

a. a plurality of radar transmitters, each radar transmitter having a transmitter adjuster for tuning the output of the respective transmitter;

b. at least one radar receiver; and c. a radar processor arranged:

d. in a calibration cycle, to transmit from a single radar transmitter using the transmitter adjuster;

e. to obtain an estimate of the error in the transmitter adjuster, f. to adjust the transmitter adjuster according to the estimate of the error; and g. in an operation cycle, to cause the radar transmitters to transmit using a plurality of the radar transmitters, the signal being transmitter from each radar transmitter being tuned by the transmitter adjuster; and h. to repeat calibration cycles interspersed between operation cycles during operation.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
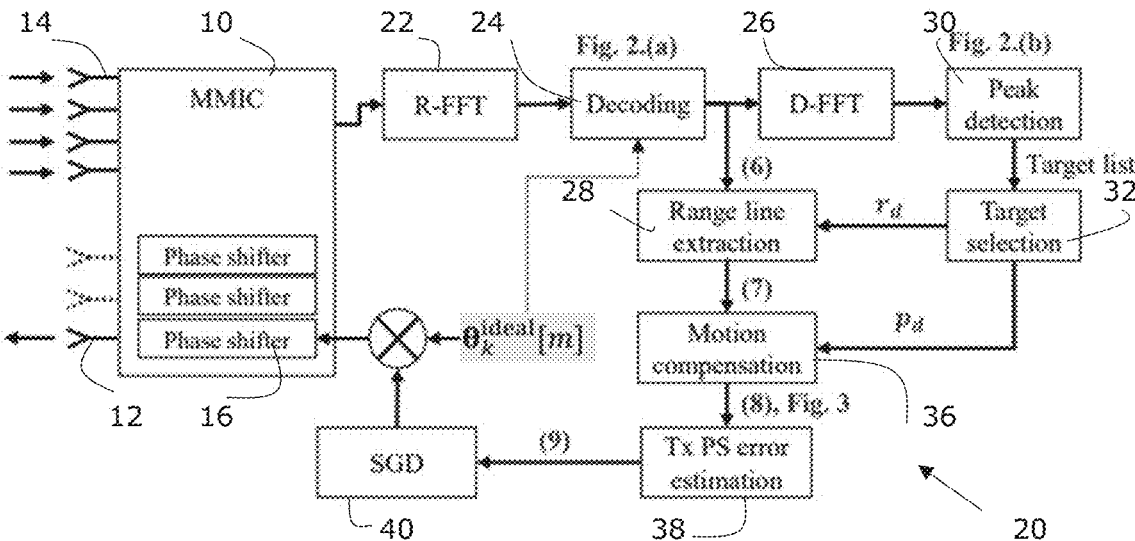
FIG. 1 depicts a Tx PS calibration routine for a single Tx antenna.

An embodiment of the disclosure will be presented in the context of a FMCW ST PC system. Accordingly, a mathematical description of this system will be presented first, so that the difficulty in extracting the error in the phase shift may be understood, before the proposed solution is described.

Phase Shifter Error

This section presents a mathematical model of the ST-PC FMCW waveform including Tx PS errors. This model helps to understand the impact of Tx PS error artifacts on the radar system. The general ST-PC FMCW waveform equation can be written as $$s(t) = \sum_{k=0}^{N_{T_x}-1} \sum_{m=0}^{N_R-1} u(t - mT) \cdot e^{i\theta_k[m]} \tag{1}$$

where i is the imaginary unit, u(t) represents a single FMCW chirp defined over the interval $0 < t < T$ with T the chirp duration and with the fly-back time being neglected.

The ramp index is given by m=0, . . . $N_R$−1 and the Tx index is given by k=0, . . . $N_{Tx}$−1

Let k be a specific Tx index, $\theta_k$ is the Tx specific PS vector containing the ST-PC code associated to each ramp m.

$$\theta_k[m] = \theta_k^{ideal}[m] + \theta_k^{err}[m] \quad (2)$$

$$\theta_k[m] \in C_k = \underbrace{\{\phi_1, \ldots, \phi_{N_k}\}}_{C_k^{ideal}} + \underbrace{\{\delta_1, \ldots, \delta_{N_k}\}}_{C_k^{err}},$$

where each element of the vector belongs to one point of the Tx PS constellation $C_k$. Each element j of the constellation is the combination of the desired phase shift $\phi$ and the error $\delta$ with the constellation index $j=1, \ldots N_k$ and $\phi_j$, $\delta_j \in [0,2\pi]$.

The dechirped and discretized received signal can be expressed as $$S_{IF}[q, m, n] = \sum_{z=0}^{Z-1} \alpha_z \sum_{k=0}^{N_{T_x}-1} \overbrace{e^{i(2\pi(f_z^R q + f_z^D m + \phi_z[k,n]))}}^{X_{k,z}[q,m,n]} \cdot e^{i\theta_k[m]} \quad (3)$$

where q is the fast-time sample index with $q=0, \ldots N_{sample}-1$, n is the Rx index with $n=0, \ldots N_{Rx}-1$, Z is the number of scattering points (targets). $X_{k,z}[q,m,n]$ is a single target z reflection of normalized amplitude with frequencies $f_z^R$ along the fast-time q, $f_z^D$ along the slow-time m, and with the spatial phase component $\phi_z[k,n]$ depending on the Tx and Rx index according to the standard FMCW signal model. $\alpha_z$ is the target scattering amplitude. Additive measurement noise is neglected to simplify the equation.

Let us consider the two successive discrete Fourier transforms (DFT) of (3)

$$\underbrace{F_q(S_{IF}[q, m, n])}_{S_R[r,m,n]} = \sum_{z=0}^{Z-1} \alpha_z \sum_{k=0}^{N_{T_x}-1} \overbrace{(F_q(X_{k,z}[q, m, n]) \cdot e^{i\theta_k[m]})}^{Y_{k,z}[r,m,n]} \quad (4)$$

$$\underbrace{F_m(S_R[r, m, n])}_{S_{RD}[r,p,n]} = \sum_{z=0}^{Z-1} \alpha_z \sum_{k=0}^{N_{T_x}-1} \overbrace{(F_q(X_{k,z}[q, m, n]) \cdot e^{i\theta_k^{ideal}[m]})}^{Y_{k,z}[r,m,n]} * \quad (5)$$

$$\underbrace{F_m(e^{i\theta_k^{err}[m]})}_{Q_k[m]}$$

where $F_q$ denotes the DFT operation along the fast-time dimension q, $F_m$ represents the DFT operation along the slow-time dimension m, * is the convolution operator, r is the range index and p is the velocity (Doppler) index. The fast Fourier transform (FFT) is usually utilized in the automotive domain and so these DFT operations along the fast and slow time dimensions respectively are referred to later as the range-FFT (R-FFT) and the Doppler-FFT (D-FFT).

The DFT associated with each target in the velocity dimension is convolved with the artifact term $Q_k[m]$. Equation (5) is only valid for ST-PC methods where decoding happens after the D-FFT such as Doppler-division multiplexing (DDM). DDM will be used in the example below as it allows the use of spurious modulation artifacts as secondary metrics to evaluate the performance of the presented method. Accordingly, DDM functions well as an example. However, the disclosure is not limited to such methods.

For other methods involving decoding before the second DFT, the artifact term $Q_k[m]$ would be altered by decoding and would still distort the radar performance. Following this equation, each target generates artifacts along the velocity dimension proportional to the target scattering amplitude. Hence, a target reflection can negatively influence the detection of a weaker target at the same range.

In other words, the artifact term $Q_k[m]$ creates artifacts in the measured data which should be minimized to improve radar detection.

Phase Shifters Online Calibration Method

Embodiments minimize the influence of the artifact term $Q_k[m]$ in (5) by estimating each individual Tx constellation $C_k$ and adjusting the Tx PS configuration opposite to any observed deviation. According to (4) and (5)

$$\theta_k^{err}$$

is buried deeply within two summations which makes it difficult to isolate and hence to use in subsequent processing.

To achieve this isolation, the proposed online calibration method may rely on a special calibration mode in which a particular Tx path is individually activated while maintaining its specific ST-PC modulation. Furthermore, targets of interest utilized to estimate the erroneous constellation may be selected after D-FFT such that no ambiguity exists between targets. Both steps are detailed in the following section. FIG. 1 depicts the complete Tx PS calibration routine for a single Tx antenna. Once all Tx PS are calibrated, all Tx can be activated simultaneously for normal radar operation.

Let k be the index of a particular Tx ($T_{X_k}$) activated individually while maintaining its Tx specific ST-PC modulation code $\theta_k$. As only one Tx is activated, decoding is trivial using the inverse of the ideal code, $-\theta_k^{ideal}$, on each range line. For an unknown number of targets Z after decoding, (4) becomes $$S_{R,k}[r, m, n] = \sum_{z=0}^{Z-1} \alpha_z \cdot Y_{k,z}[r, m, n] \cdot e^{i\theta_k^{err}[m]} \quad (6)$$

Solving Target Ambiguity

In (6), the summation over all Z targets prevents a direct evaluation of $\theta_k^{err}$. To solve this, a specific target needs to be isolated.

FIG. 1 illustrates an example process flow used.

An MMIC 10 includes a plurality of transmitters Tx 12 and a plurality of receivers Rx 14. In a conventional operation mode the transmitters 12 and receivers 14 operate together. FIG. 1 illustrates the case of three transmitters 12 and four receivers 14, which using MIMO techniques means that there are 12 (3 times 4) virtual channels. Each transmitter has an associated transmitter adjuster, in the illustrated example a phase shifter 16, to fine-tune the phase of each respective transmitter.

FIG. 1 illustrates the case of operation not in the conventional operation mode, but in a calibration mode, in which only one of the transmitters 12 is operated. The constellation used remains the same, e.g. the data is transmitted in the same way. For the example of quadrature phase shift keying (QPSK) this means that the transmitter transmits chirps using each of the four constellation points (0, $\pi/2$, $\pi$, $3\pi/2$) in turn, using the same phase shift on the phase shifter as in the conventional operation mode.

The output of the MMIC 10 is passed through a radar controller having a number of operation blocks 20 illustrated in FIG. 1. These may be implemented in the MMIC and or in a microcontroller chip connected to the MMIC, or even in a general processor connected to the MMIC or connected to the MMIC through a microcontroller chip. Those skilled in the art will realize that different radar systems provide the various operation blocks divided over multiple hardware chips in this way, or indeed in a single chip.

The first operation block is the range FFT 22 (Equation (4)). The output of this block is then passed to decoding block 24. The output of this is passed to the Doppler FFT 26 which carries out the Doppler FFT of Equation (5), as well as to the range line extraction block 28. The output of the Doppler FFT 26 is passed to a peak detector 30 and then on to target selection block 32 which selects a single target. Thus, the isolation of the target is provided by this radar processing. FIG. 2 illustrates the target isolation.

The Range-FFT 22 isolates the target(s) in the range domain, the Doppler-FFT 26 isolates the target(s) in the velocity domain.

The range line extraction block 28 gets the target selected by target selection block 32 and extracts the corresponding range vector 50 (range line)—see FIG. 2. This is then passed to motion compensation block 36 which also has an input from target selection block 32 and which outputs to error estimation block 38.

The output of the error estimation block 38 is not directly applied to the phase shifter 16, as the error estimation block only estimates the error and may not exactly calculate it. Therefore, only a small fraction of the error estimated is applied to the phase shifter 16 through stochastic gradient descent block 40. The estimated error is then combined with the calculated ideal angle $\theta_k$.

The error estimation is calculated repeatedly, and the stochastic error estimation block slowly converges on an estimated error corresponding to the real error over time. Because the correction is continuous, the approach can deal with slowly varying errors such as those caused by the device aging or even, over a shorter time frame, changes in temperature or other operating conditions.

Figure 7:
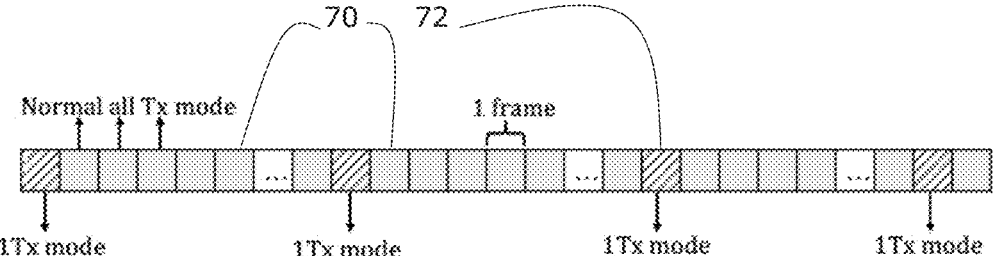
FIG. 7 illustrates interspersion of single calibration mode cycles between normal mode cycles.

Note that a calibration mode cycle or a plurality of calibration mode cycles can be interspersed between plural normal mode cycles. In the latter, all transmitters operate. FIG. 7 illustrates the interspersion of single calibration mode cycles 72 between normal mode cycles 70. The time axis is horizontal.

Note that although calibration mode cycles 72 operate with only one transmitter they can still collect useful data and the output can also be fed into subsequent data processing (not shown) to detect changes in the environment, just with lower accuracy than the operation mode cycles 70.
Error Estimation The way in which error estimation is carried out (block 38) will now be described in more detail for the specific example described above.

Figures 2A, 2B:
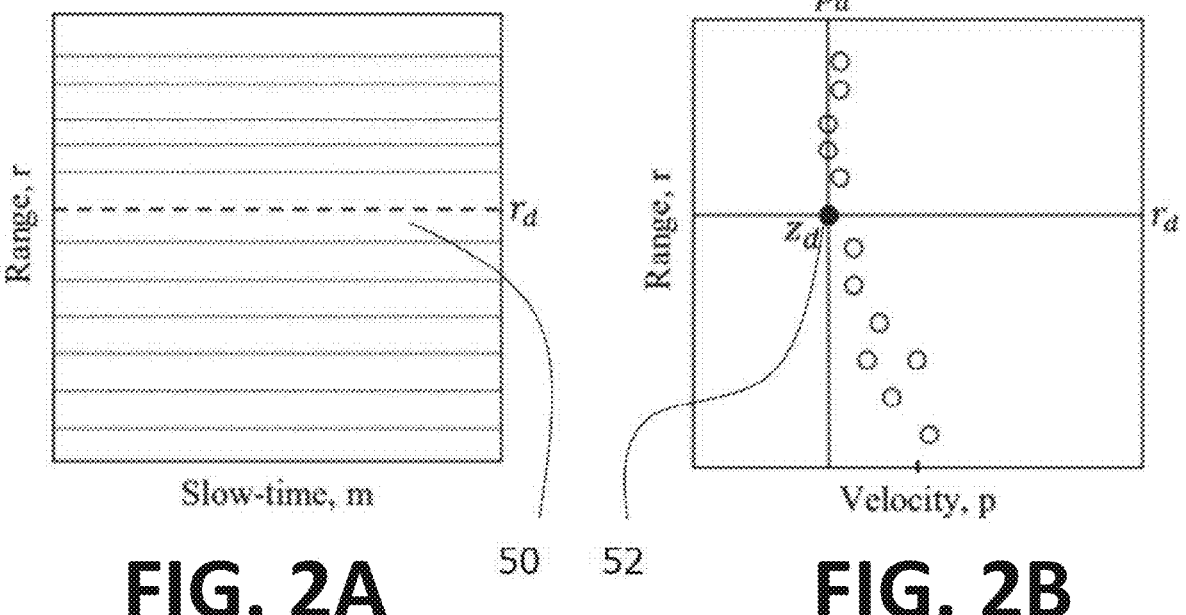
FIG. 2 illustrates a target isolation operation.

Let $z_d$ be a particular detection with no other detection on the same range line (50, cf. FIG. 2). Such detection can be identified from the target list given by the peak detection operation depicted in FIG. 1. The target list provides both the range and the velocity information of detected peaks after the D-FFT step. Let $r_d$ be the range bin of the spectrum associated with the frequency term $f_{z_d}{}^R$ from (3) and pa be the velocity bin index which can be associated with the frequency term $f_{z_d}{}^D$ and $\tilde{\phi}_{z_d,k,n}$ the measured phase from (3) associated with the selected target $z_d$. This measured phase is the phase of the data in the data bin at the target location 52 illustrated in FIG. 2(b).

The vector corresponding to the range of interest $r_d$ extracted from (6) for an arbitrary Rx antenna index n is given by $$S_{R,r_d,n}[m] = \alpha_{z_d} \cdot e^{\left(2\pi f_{z_d}^D m + \phi_{z_d,k,n}\right)} \cdot e^{i\theta_k^{err}[m]} \tag{7}$$

This vector will be referred to a range vector below; it represents an exactly defined range line.

After that, a few unknowns remain: the amplitude $\alpha_{z_d}$, the direction of arrival related phase component $\phi_{z_d,k,n}$ and the $T_{X_k}$ PS error term $$\theta_k^{err}$$

which is what is required to be measured. $f_D{}^z$ is known from the D-FFT step. $\alpha_{z_d}$, and $f_D{}^z$ are removed by extracting the argument of (6) and compensating for the already estimated motion $$\beta_k[m] = \arg\left(s_{R,r_d,n}[m]\right) - 2\pi f_{z_d}^D m = \theta_k^{err}[m] + \phi_{zd,k,n}. \tag{8}$$

Figure 3:
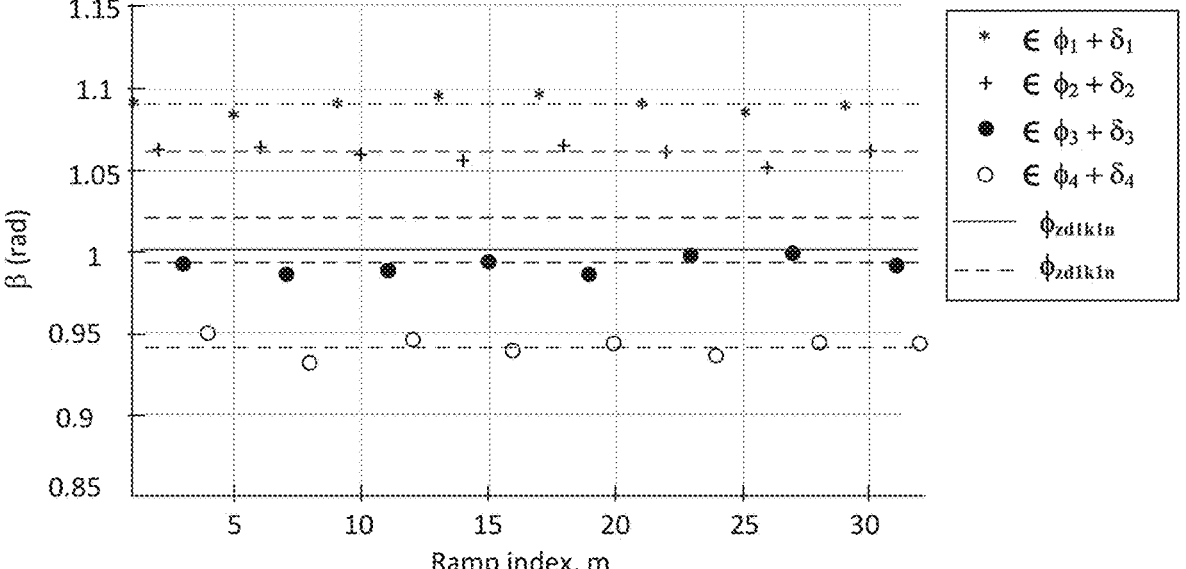
FIG. 3 illustrates an example plot of $\beta$ versus ramp index, m.

The result of (8) is illustrated in FIG. 3 for a quadrature phase shift keying (QPSK) constellation $\{\phi 1+\delta 1, \ldots, \phi 4+\delta 4\}$ over 32 ramps. Each dots represents an element of $\beta k$ [m] for m=1, . . . , 32. The constellation point with which the ramp m was modulated corresponds to the horizontal rows of data which correspond to the four phases of QPSK on the right.

In the Example of FIG. 3, the actual direction of the target is at an angle of 1 radian, represented by the horizontal full line. The measured direction of arrival is the average of the phase values for all of the data, e.g. over all of the constellation points. This measured direction of arrival is represented by the horizontal dashed line, e.g. in this example is at an angle of 1.02 radians. This value is the same as the phase of the target constellation point in the range-Doppler representation of FIG. 2(b), e.g. the phase of the indicated point in that figure. The horizontal rows of points correspond to each of the four constellation points of a QPSK constellation, nominally at 0, $\pi/2$, $\pi$ and $3\pi/2$, wherein FIG. 3 is already corrected for these nominal values. Thus, in the illustrated example, the phase of the constellation point corresponding to the bins uppermost in FIG. 3 (the uppermost dashed line) is measured to be an average of 1.09 radians. The correction value to be applied to this constellation point is accordingly this average value 1.09 minus the measured phase of the target at 1.02 radians, e.g. the correction $\delta$ to be applied to this constellation point is −0.07 radians. The mathematics behind this example will now be described in more detail.

For an ideal system with no Tx PS errors nor noise, it can be expected that $\beta_k$ [m]=$\tilde{\phi}_{z_d,k,n}$, the measured phase of the detected target complex peak. Instead, each element of the vector is shifted by its associated Tx PS error $\{\delta 1, \ldots, \delta 4\}$.

Averaging over the indexes m corresponding to the jth constellation point and comparing the result with $\tilde{\phi}_{z_d,k,n}$ yields the final estimates of Tx PS errors $\delta j$ for each of the four constellation points indexed by j according to $$\delta_j = \text{mean}(\beta_k[m \in M_{k,j}]) - \widetilde{\phi_{z_d,k,n}} = \delta_j + \underbrace{(\phi_{z_d,k,n} - \widetilde{\phi_{z_d,k,n}})}_{\text{Tx PS Bias}}.$$

with $M_{k,j}$ the set of ramp indexes belonging to the same constellation point j according to $T_{X_k}$ modulation code.

A small absolute phase error remains on all elements of the constellation. This error is a bias introduced by Tx PS errors. The proposed calibration method addresses only Tx PS imbalances and not bias, the Tx PS bias is therefore left untouched.

The result of (9) may be used to adjust the Tx phase shifter 16 configuration. In the embodiment described, errors estimation should be used to adjust the Tx PS configuration in a stochastic gradient descent (SGD) method over multiple iterations. As Tx PS errors estimation is based on many assumptions on the selected target, multiple iterations are needed to average out any missed assumption. Multiple targets of the same frame could be used to feed the SGD.

Evaluation on ST-PC FMCW Automotive Radar

Figure 4:
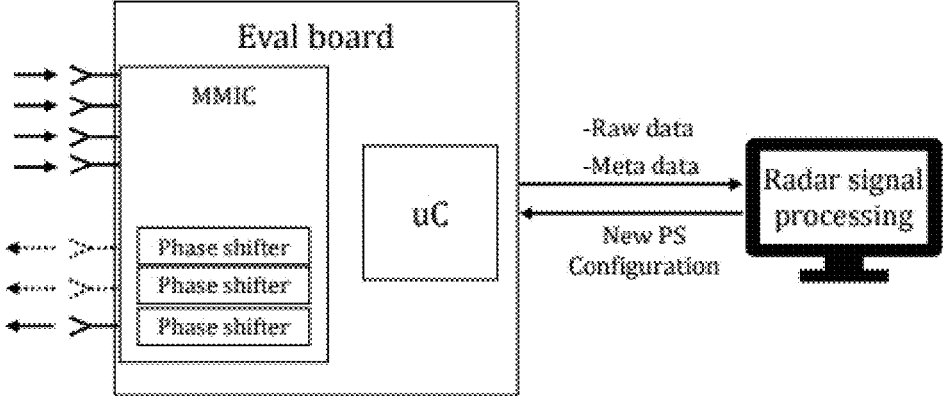
FIG. 4 illustrates an example system including an RF evaluation board and a PC.

The presented Tx PS calibration method was tested on a real setup with a radar system evaluation board. An RF evaluation board was used to acquire the raw data and the radar signal processing was performed on a PC. This is illustrated in FIG. 4.

The selected MMIC features three Tx and four Rx channels. All three Tx PS undergo the same online calibration following the previously described method for which the same QPSK DDM sequence is selected {0°, 90°, 180°, 270°}.

Figure 5A:
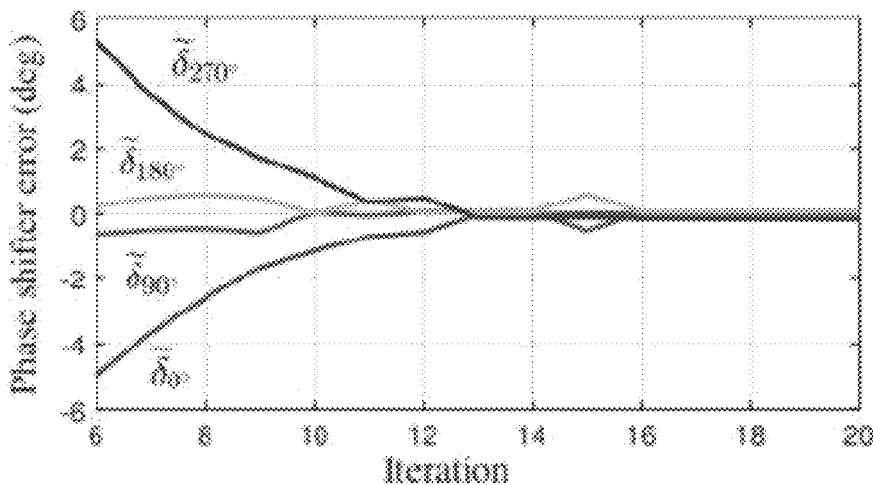
FIGS. 5A-5C illustrate a series of waveform plots.
Figure 5B:
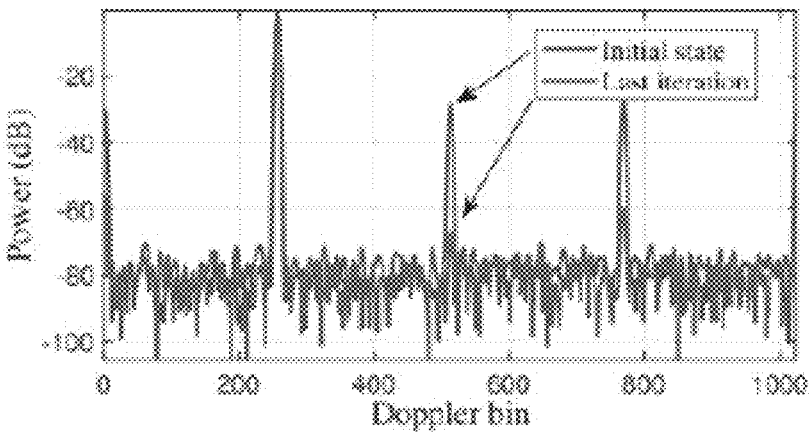

In FIG. 5a estimated Tx PS errors are used as a metric to show convergence of the algorithm in a single-Tx mode. Using DDM as a modulation scheme for calibration, spur level after non-coherent integration (NCI) is used as a secondary metric as illustrated in FIG. 5b.

After convergence of the calibration on all Tx, a multi-Tx DDM frame is sampled using the code introduced in Table 1 using the adjusted Tx PS configuration provided by the online calibration method.

TABLE 1

| DDM QPSK phase code used for experimentation. | | | |
|---|---|---|---|
| | Phase shift 1 | Phase shift 2 | Phase shift 3 | Phase shift 4 |
| Tx1 | 0° | 0° | 0° | 0° |
| Tx2 | 0° | 180° | 0° | 180° |
| Tx3 | 0° | 90° | 180° | 270° |

Figure 6:
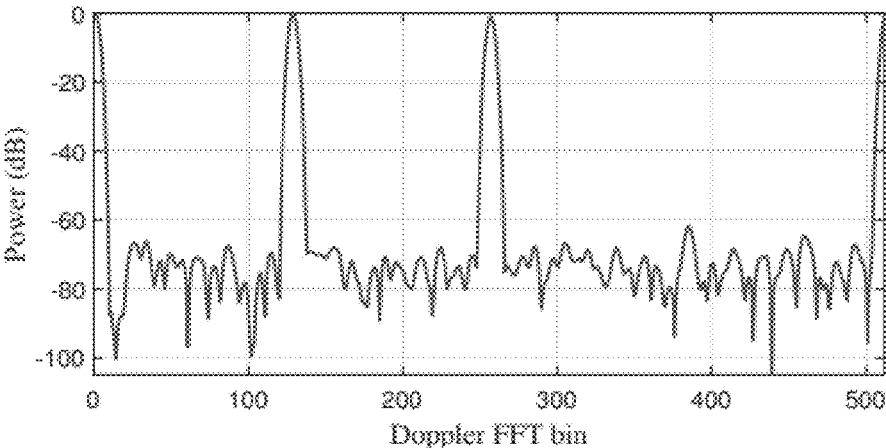
FIG. 6 illustrates a plot of power versus Doppler FFT bin.

Accordingly, three main peaks are seen in FIG. 6 (the first peak is shared between the first and last bin). Both, Tx2 and Tx3, are expected to create spurs. Tx2 creates a spur that falls perfectly on Tx1 associated peaks. Tx3 creates three spurs that fall perfectly on the peaks associated to Tx1 and Tx2. The third spur of Tx3 remains isolated on the space left free.

Figure 5C:
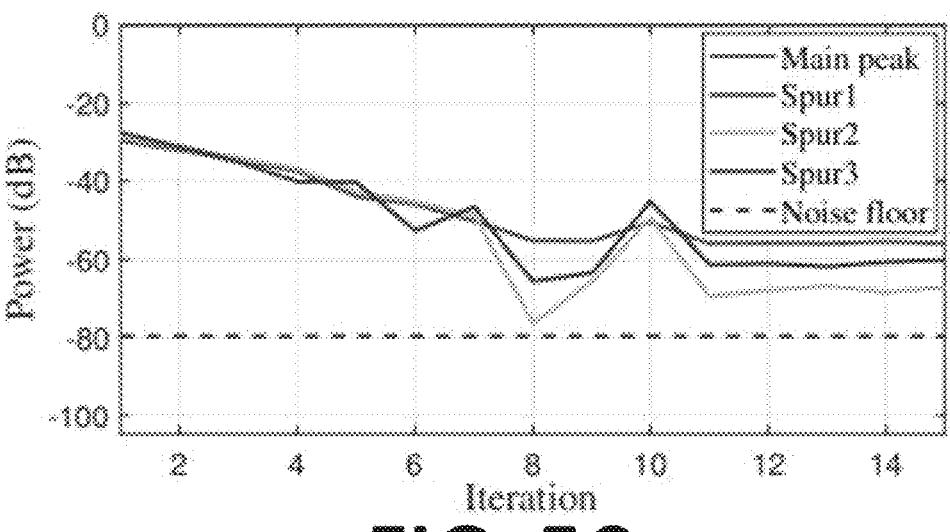

To verify that the calibration is improving the detection after switching back from single-Tx calibration mode to multi-Tx mode, the remaining isolated spur's level is used as a metric. In FIG. 6, Tx3 isolated spur level is close to −60 dB which corresponds to the calibration spur level seen in FIG. 5c.

Results

The conducted experiment demonstrates the convergence of the proposed algorithm during the single-Tx PS calibration mode and shows the validity of the correction when all calibrated transmitters are used in a normal multi-Tx mode. During single-Tx PS calibration mode, Tx phase errors estimation dropped below 0.2° for each constellation point. It has been verified that the post-calibration artifact level is also maintained when re-enabling all Tx using their calibrated Tx PS.

Although the method has been described in the context of a particular approach, those skilled in the art will realize that the method is not limited to the exact calibration proposed.

By using an iterative calibration method it is possible to calibrate PS Tx at any stage of the radar system life cycle. This relaxes the EoL calibration effort and allows for a continuous optimal system sensibility according to the theoretical modulation performance. In particular, Tx PS modulation artifacts such as spurs are reduced.

It will be appreciated that in addition to calibrating the phase error for each Tx this method may also be used to more general IQ errors by also considering gain errors for Tx PS capable of such modulations.

Use of IFFT

A computationally efficient method will now be described for estimating the phase shifter constellation error vector $$\theta_k^{err}$$

where the "vector" refers to the k points of the constellation.

The inventor has made calculations (Mayeul et al, "Modeling and Removing Doppler Division Multiplexing Spurs in Automotive MIMO radar", IEEE Sensors journal, Vol. 23, No. 2, 15 Jan. 2023) relating to a "code vector" in the case of phase inaccuracies in the points of a DDM constellation. Slight inaccuracies in the phase of the different constellations result in a main point at the position in the range Doppler data cube corresponding to the detected targets range and velocity, together with spurs offset from the main point.

Figure 8:
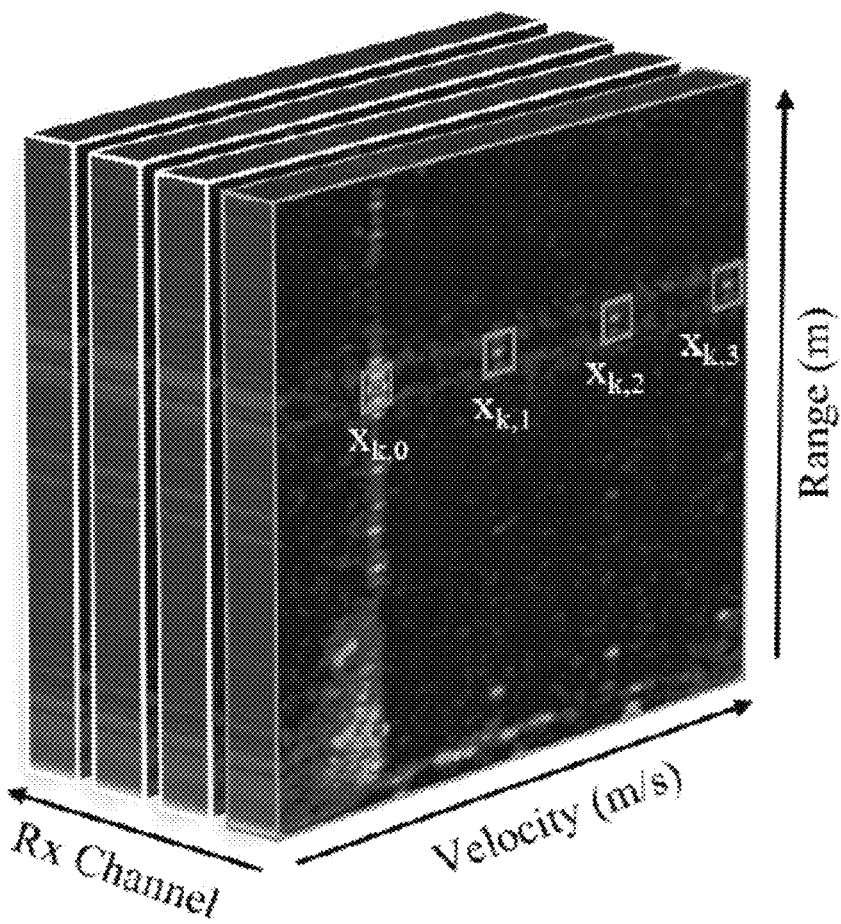
FIG. 8 illustrates a Range-Doppler data cube.

Let k be the Tx index of a DDM modulated radar system. Each transmitter Tx is assigned an $N_k$ points constellation associated with the DDM code. An isolate Tx-k generates both a peak and some evenly spaced spurs along the velocity axis of the Range-Doppler data cube for each target, as illustrated in FIG. 8, which shows the Range-Doppler data cube comprising a main peak with a (complex) data value $x_{k,0}$ and spurs. In the example of FIG. 8, there are four constellation points and hence spurs labelled $x_{k,1}$, $x_{k,2}$, $x_{k,3}$. Note that these x values are the values at evenly spaced points: there is no need to find the peak location of the spurs, it is simply necessary to take the complex number value at these points based on the location of the main peak.

By using an inverse discrete Fourier transform, IDFT over the four points of the spurs, the right hand side of the following equation can be calculated: note that the $\omega_N = e^{i2\pi/N}$ so that the right hand side is simply the IDFT of a small number of points.

$$a_k e^{i\theta_{k,n}^{err}} = \sum_{j=0}^{N_k-1} x_{k,j} \omega_{Nk}^{nj} \tag{10}$$

$$e^{i\theta_{k,n}^{err}}$$

11 12 is the element wise exponential function giving a vector of the same length as the error vector $$\theta_k^{err}$$

translating each phase value of the vector into its associated complex point.

Figure 9:
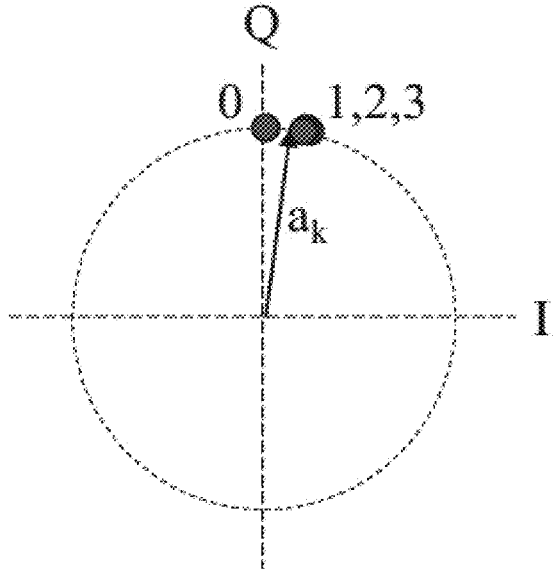
FIG. 9 illustrates an IQ plot.

The value of $a_k$ is not known. However, as illustrated in FIG. 9, if the four points each calculated from the right hand side of equation (10) are plotted, for each of the four values of j, it will be seen that the points corresponding to j=1, 2 and 3 appear aligned and the point corresponding to j=0 appears to be offset. Thus, a correction value could be applied to the j=0 constellation point to align all four points and minimize spurs as much as possible.

One way of estimating $a_k$ is to use the average location of the points. The deviation of each of the points in FIG. 9 from this average value can be used to apply a corresponding correction to the constellation point to correct spurs.

Thus, this approach provides a computationally efficient way of carrying out the necessary calculations, as the IDFT of four points is straightforward to calculate.

What is claimed is:

1. A method of operating a radar system having a plurality of radar transmitters and at least one radar receiver, each radar transmitter having a transmitter adjuster for tuning an output of a respective transmitter, the method comprising:
  in a calibration cycle,
    transmitting from a single radar transmitter using the transmitter adjuster while all other radar transmitters in the plurality of radar transmitters are deactivated;
    receiving a resulting signal on the at least one radar receiver;
    identifying a target based on the resulting signal;
    carrying out a range vector extraction on a decoded range Fourier transform corresponding to the target to obtain an extracted range vector;
    obtaining an estimate of an error in the transmitter adjuster using the extracted range vector; and
    tuning the transmitter adjuster according to the estimate of the error; and
  in an operation cycle,
    transmitting a signal using the plurality of radar transmitters, the signal being transmitted from each radar transmitter using the tuned transmitter adjuster; and
    repeating calibration cycles interspersed between operation cycles during operation.

2. The method according to claim 1, wherein the tuning of the transmitter adjuster according to the estimate of the error uses an iterative approach to tune the transmitter adjuster over several iterations of the calibration cycle.

3. The method according to claim 1, wherein tuning the transmitter adjuster using the estimate of the error adjusts the transmitter adjuster using a fraction p of the error where p is no greater than 0.2 so that the respective transmitter is tuned successively over multiple calibration cycles.

4. The method according to claim 1, wherein in successive calibration cycles successive individual radar transmitters are used for transmitting.

5. The method according to claim 1, further comprising, in the calibration cycle, after transmitting from the single radar transmitter,
  carrying out a range FFT over a fast time dimension on the resulting signal to obtain a range-slow time representation;

carrying out a Doppler FFT over a slow time dimension to obtain a range-Doppler representation;
carrying out a peak detection on the range-Doppler representation to create a target list; and
selecting the target from the target list.

6. The method according to claim 5, wherein receiving the resulting signal on the at least one radar receiver, carrying out the range FFT over the fast time dimension to obtain the range-slow time representation, and carrying out the Doppler FFT over the slow time dimension to obtain the range-Doppler representation are carried out in both the calibration cycle and the operation cycle,
  the method further comprising processing the range-Doppler representation to identify positions of targets in both the operation cycle and the calibration cycle.

7. The method according to claim 5, wherein the method comprises:
  identifying a main peak in the range-Doppler representation having a plurality of spurs offset from the main peak in a Doppler direction,
  wherein obtaining the estimate of the error in the transmitter adjuster comprises carrying out an inverse discrete Fourier transform on complex numbers representing an angle and phase at the main peak and each of the spurs.

8. The method according to claim 1 further comprising carrying out motion compensation on the extracted range vector to obtain a motion compensated extracted range vector, and using the motion compensated extracted range vector.

9. The method according to claim 1 wherein the target is selected from a target list based on a criteria of being separated in range and Doppler from other targets in the target list and/or by representing a strong signal peak.

10. The method according to claim 1, wherein each transmitter transmits successively at a plurality of constellation points of a constellation, and each transmitter adjuster is a transmitter phase shifter arranged to control a phase of individual ramp phases of respective constellation points on the respective transmitter.

11. A radar apparatus comprising:
  a plurality of radar transmitters, each radar transmitter having a transmitter adjuster for tuning an output of the respective transmitter;
  at least one radar receiver; and
  a radar controller arranged configured to:
    in a calibration cycle,
      transmit from a single radar transmitter using the transmitter adjuster while all other radar transmitters of the plurality of radar transmitters are deactivated;
      identify a main peak in a range-Doppler representation having a plurality of spurs offset from the main peak in a Doppler direction,
      obtain an estimate of the error in the transmitter adjuster by carrying out an inverse discrete Fourier transform on complex numbers representing an angle and phase at the main peak and each of the spurs;
      adjust the transmitter adjuster according to the estimate of the error; and
    in an operation cycle,
      cause the plurality of radar transmitters to transmit a signal, the signal being transmitted from each radar transmitter being tuned by the transmitter adjuster; and

repeat calibration cycles interspersed between operation cycles during operation.

12. A radar apparatus, comprising:

a plurality of radar transmitters, each radar transmitter having a transmitter adjuster for tuning an output of a respective transmitter;

at least one radar receiver; and a radar controller configured to in a calibration cycle, transmit from a single radar transmitter using the transmitter adjuster while all other radar transmitters in the plurality of radar transmitters are deactivated;

receive a resulting signal on the at least one radar receiver;

identify a target based on the resulting signal;

carry out a range vector extraction on a decoded range Fourier transform corresponding to the target to obtain an extracted range vector;

obtain an estimate of an error in the transmitter adjuster using the extracted range vector; and tune the transmitter adjuster according to the estimate of the error; and in an operation cycle, transmit a signal using the plurality of radar transmitters, the signal being transmitted from each radar transmitter using the tuned transmitter adjuster; and repeat calibration cycles interspersed between operation cycles during operation.

13. The radar apparatus of claim 12, wherein in successive calibration cycles successive individual radar transmitters are used for transmitting.

14. The radar apparatus of claim 12, wherein each transmitter transmits successively at a plurality of constellation points of a constellation, and each transmitter adjuster is a transmitter phase shifter arranged to control a phase of individual ramp phases of respective constellation points on the respective transmitter.

15. The radar apparatus of claim 12, wherein the radar controller is configured to, in the calibration cycle, after transmitting from the single radar transmitter, carrying out a range FFT over a fast time dimension on the resulting signal to obtain a range-slow time representation;

carrying out a Doppler FFT over a slow time dimension to obtain a range-Doppler representation;

carrying out a peak detection on the range-Doppler representation to create a target list; and selecting the target from the target list.

16. The radar apparatus of claim 15, wherein the radar controller is configured to carry out motion compensation on the extracted range vector to obtain a motion compensated extracted range vector, and using the motion compensated extracted range vector.

17. The radar apparatus of claim 15 wherein the target is selected from a target list based on a criteria of being separated in range and Doppler from other targets in the target list or by representing a strong signal peak.

18. The radar apparatus of claim 15, wherein the radar controller is configured to receive the resulting signal on the at least one radar receiver, carry out the range FFT over the fast time dimension to obtain the range-slow time representation, and carry out the Doppler FFT over the slow time dimension to obtain the range-Doppler representation in both the calibration cycle and the operation cycle, and process the range-Doppler representation to identify positions of targets in both the operation cycle and the calibration cycle.

19. The radar apparatus of claim 15, wherein the radar controller is configured to:

identify a main peak in the range-Doppler representation having a plurality of spurs offset from the main peak in a Doppler direction, obtain the estimate of the error in the transmitter adjuster by carrying out an inverse discrete Fourier transform on complex numbers representing an angle and phase at the main peak and each of the spurs.

* * * * *